Figure 1:
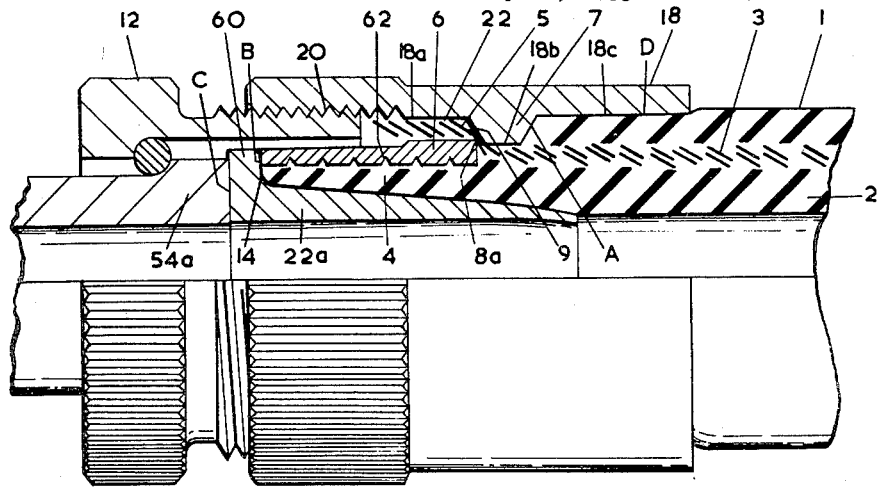

Nov. 20, 1962  W. A. MELSOM  3,064,999
FLEXIBLE HOSE COUPLING WITH CLAMP FOR HOSE BRAID
Original Filed May 14, 1953

3,064,999
FLEXIBLE HOSE COUPLING WITH CLAMP FOR HOSE BRAID
Walter Arthur Melsom, Wembley, England, assignor to Bowden (Engineers) Limited, London, England
Continuation of application Ser. No. 354,915, May 14, 1953. This application Mar. 2, 1959, Ser. No. 796,419
6 Claims. (Cl. 285—149)

This application is a continuation of my co-pending application Serial No. 354,915 filed May 14, 1953, now abandoned.

The present invention relates to improvement in flexible hose coupling components of the kind employing a flexible hose with an inner tube of resilient material and a covering of braided reinforcing material and a detachable end fitting by which the tubular component may be connected to other apparatus.

The reinforcing material may be primarily of a layer or layers of ribbon-like groups of fine wires, e.g., of high tensile steel, braided to tubular form although it may have a fabric covering or it may consist of a number of such layers which are separated by thin layers of a nonmetallic material. The reinforcing material may also be of fabric.

The present invention aims at a hose consrtuction of the kind specified in which the end fitting comprises cooperating detachable clamping members, and wherein an effective grip is obtained on an end portion of the reinforcing layer between gripping surfaces on the fitting and an end portion of the resilient tube is securely sealed to the fitting as the result of axially moving and holding together the clamping members.

The fundamental principle of the present invention is that the end portion of the reinforcing tubular layer is firmly secured separately from the sealing of the end portion of the inner resilient tube, the sealing of the said end portion of the inner tube being effected by the formation of a lip seal so that, providing an initial seal is formed, internal pressure will tend to increase the effectiveness of the seal, the said initial seal being effected by inducing internal stress in the material of the end portion of the inner resilient tube. This effect is achieved by mutually cooperating members of the fitting which can be removed and applied again to the same or another length of hose similar to that from which said members had been removed and in this sense the fittings are detachable and reusable. It follows from the foregoing that pressure-tight jointing must be made between the members of the fitting which would otherwise form an escape path or paths to the exterior of the fitting.

Considerable radial force may have to be applied to the end portion of the resilient tube to form the desired lip seal, since when the reinforcing layer is separated from the inner resilient tube the outer surface of the inner resilient tube may be very irregular.

I achieve the foregoing aims by providing a socket, a sleeve, an insert and an axial clamping means by which the said sleeve can be moved axially relative to the said socket, and the said insert can be moved axially relative to the said sleeve. The said socket is provided with a tapering zone forming an internal gripping face. Forwardly adjacent this gripping face the socket has a bore of such small diameter that it will pass closely over the reinforcing layer. Rearwards of the gripping face the sleeve may have a larger bore of a diameter substantially greater than the external diameter of the said sleeve. Where the hose component has an outer resilient tube a further internal bore is provided in the said socket, the diameter being such that it will receive an end portion of the outer resilient tube, this bore being disposed forwardly of the aforesaid smaller bore forming a forward shoulder. The said sleeve is provided with a bore of a diameter such that an end portion of the inner resilient tube will enter closely therein and remain parallel and concentric to the axis of the inner resilient tube. Preferably an annular or helical groove or grooves are formed in the bore of the sleeve. The external diameter of the said sleeve is greater than the aforesaid smaller bore of said socket, the said insert has an external diameter substantially greater than the bore of the resilient inner tube and has an axial extension in the forward direction at least equal to and in some cases greater than the aforesaid smaller bore in the socket.

In the coupling components according to the invention an end portion of the reinforcing layer is separated from the inner resilient tube so that the sleeve can be introduced over the inner resilient tube and under the reinforcing layer, the socket having been previously disposed forwardly over the hose. In the case where the hose has an outer resilient tube this is cut back a predetermined amount to allow for the correct forward disposition of the said socket. The insert is then entered into the bore of the inner resilient tube so that the outer surface of the inner resilient tube is forced into contact with the inner surface of the sleeve, which surface constrains the material of the inner resilient tube against outward radial displacement and so that the said material is forced into the grooves aforesaid so that inner tube material is keyed to the sleeve and relative axial movement between the said material and the sleeve is precluded.

The insert is then finally forced into the bore of the inner resilient tube by the clamping means so that the portion of the inner resilient tube within the sleeve is constrained by the sleeve and by the end of the annulus formed between the insert and the sleeve, internal stress being induced thereby in the material, and the portion of the inner resilient tube within the aforesaid smaller bore of the socket is outwardly displaced so that it is constrained by the said smaller bore of the socket and at the same time the said sleeve is forced back so that the reinforcing layer is gripped between the forward end of said sleeve and the aforesaid gripping face of said socket, said clamping means being provided with a means of forming pressure-tight jointing between members of the fitting which would otherwise provide an escape path or paths for the fluid under pressure.

The gripping face provided by the forward end of the sleeve and the gripping face of the socket may be shaped to be suitable for various combinations of material from which the sleeve, the socket and the reinforcing layer are made, and can take the form of complementary tapers of varying degree or the sleeve can be provided with a slight radiused corner to obtain high unit loading.

A rearward portion of the reinforcing layer may be left ungripped between the sleeve and socket and lie in the annular space between said sleeve and said socket.

The insert can be provided with an outward flange that engages the rear end of the sleeve. The insert can be integral with or separate from the means for connecting to external apparatus.

The form of the aforementioned pressure-tight jointing depends on the configuration of the said sleeve and said insert. Said pressure-tight joint may be effected by direct contact between said sleeve and said insert, or by a cooperating member, either by metal to metal contact, or by the introduction of a gasket of suitable material.

Provision can be made in the clamping means so that there is no rotation of the insert or sleeve during assembly. The proportion and configuration of the insert can be adapted to suit the physical characteristics of the material from which the resilient tube is made. Where this is relatively soft it is preferable to have a pronounced forward external taper. Where it is relatively hard, less or no general forward taper is preferred, the said proportion and configuration of the insert depending on the amount of irregularity of the outer surface of the resilient tube.

A feature of the present invention is that it is adaptable to various methods of hose construction and materials adopted in hose manufacture and provides a hose end fitting with characteristics only previously hitherto obtained with permanently swaged-on end fittings.

The metal to metal seal or seals may be formed by edge to surface engagement under the pressure of the clamping means.

Figure 2:
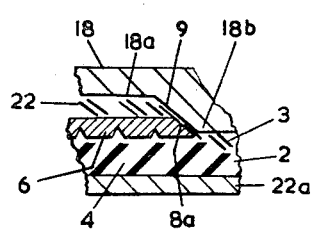
Figure 3:
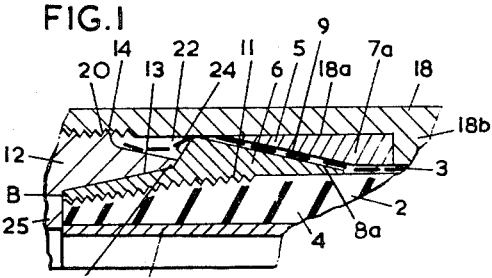
Figure 4:
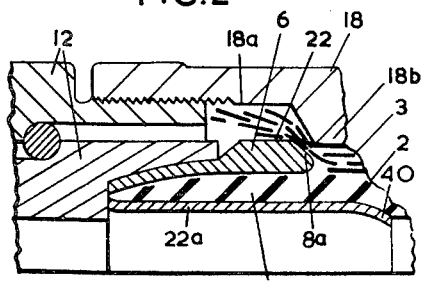
Figure 5:
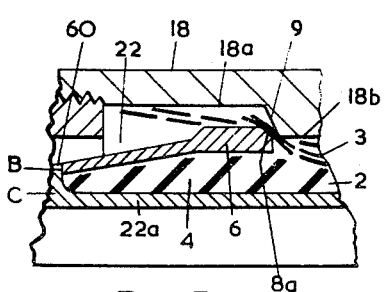
Figure 6:
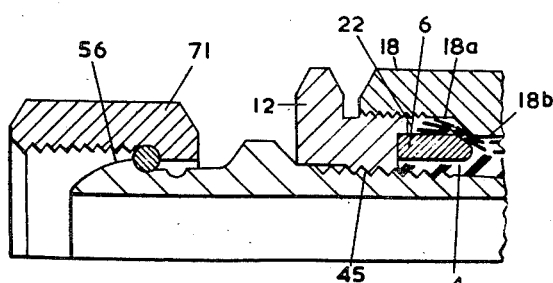
Figure 7:
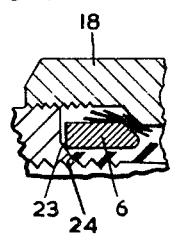

In order that the present invention may be the more readily understood, reference is made to the embodiments shown in the accompanying drawings in which:

FIG. 1 is a longitudinal section with the upper half in section of a coupling component embodying the salient features of the present invention. FIG. 2 is a fragmentary view of a modification. FIG. 3 shows inter alia a modified form of cone grip of the braid and an edge-to-surface metal to metal seal; FIG. 4 inter alia shows a modified insert; FIG. 5 shows another variant; FIG. 6 shows inter alia a form of insert combined with a nipple and FIG. 7 shows another form of metal to metal seal.

Referring to FIG. 1, which shows a hose comprising an inner resilient tube 2, a metal braided reinforcing tubular layer 3 and an outer resilient tube 1, and an end fitting comprising a socket 18, a sleeve 6, an insert 22a, a clamping means 12 and a nipple 54a for connection to external apparatus.

The socket 18 is provided with two bores 18a, 18b forming a tapering shoulder at 9, another bore 18c forming a forward shoulder at A and of such a diameter that the outer resilient tube 1 can be entered into it and a screw thread 20 at the rearward end. The sleeve 6 has an internal diameter such that a bared end portion 4 of the inner resilient tube 2 can be entered into it and remains parallel with the axis of the hose and an external diameter substantially greater than that of the bore 18b. The bore 18a of the socket 18 is substantially greater than the external diameter of the sleeve 6. The sleeve 6 is provided with annular grooves 62. The insert 22a has an external diameter substantially greater than the bore of the end portion 4 of the inner resilient tube and an outward flange 60 of a diameter substantially the same as the external diameter of the sleeve 6 and an axial extent such that it extends beyond the forward shoulder of the socket 18. The clamping means 12 is provided with a screw thread 14 that is complementary to the screwthread of the socket 18 and a means by which axial force can be transmitted to the nipple 54a when the clamping means 12 is screwed into socket 18.

The outer resilient tube is cut back to a predetermined distance that the socket 18 can be positioned as shown. The reinforcing layer 3 is separated from the end portion of the inner resilient tube and the sleeve 6 introduced so that the end portion 5 of reinforcing layer 3 lies over the outer surface of sleeve 6, and the end portion 4 lies within the said sleeve, at the same time trapping the end 5 of the reinforcing layer 3 between the sloping shoulder 9 of the socket 18. The insert 22a is then entered into the bore of the end portion 4 so that the material of said portion is outwardly displaced and constrained by the inner surface of the sleeve 6. The clamping means 12 is then screwed into the socket and tightened so that the insert 22a is forced into the hose end portion 4 and contact is made at B between the flange 60 of the insert 22a and the sleeve 6 and at C between the nipple 54a and the insert 22a so that the reinforcing member 3 is firmly gripped between the surface 8a of the sleeve 6 and the rearward shoulder 9 of the socket 18 and the end portion 4 is outwardly displaced filling the annular grooves 62, and mutual contact established between the outer surface of the end portion 4 and the inner surface of sleeve 6 and between the outer surface of the insert 22a and the inner surface of the end portion 4, so that an internal stress is induced in the end portion 4 so that an initial seal is formed. The end portion 4 will also be constrained by the socket 18 at 18b and the outer resilient tube will be constrained by the socket 18 at D.

FIG. 2 shows the gripping surface 8a on the sleeve as a conical surface complementary to the gripping surface 9 on the insert.

FIG. 3 shows a modified form where the gripping surfaces 8a and 9 are more gradually tapered, the gripping surface 9 being shown on a separate ring 7a which however may be integral with the socket. The internal surface of the sleeve 6 is in this case grooved by means of the screw thread 11. The material of the end portion 4 of the inner resilient tube is forced outwards by the insert 22a over the whole length of the latter and this form shows how the rear of the sleeve may be swaged inwards from the normal cylindrical internal form where the inner tube is of a relatively soft material and lends itself to this further squeezing pressure, the swage being effected by the conical surface 13 of the clamping means 12 during the screwing of the latter into the socket. This construction also shows by way of example how an edge to surface metal-to-metal seal may be obtained, the edge being the leading end 23 of the clamping means 12 and the surface being the tapering shoulder 24 of the sleeve.

In FIG. 4 the forward end of the insert 22a is curved inwards to provide a conoidal external leading end 40 which facilitates the entry of the insert into the smaller bore of the inner resilient tube to enable the insert to force the material of the tube outwards to the desired extent.

FIG. 5 shows another form with the insert formed substantially as shown in FIG. 4 save that it has a collar 60 functioning similarly to that shown in FIG. 1.

FIG. 6 shows a form of construction where the insert 22a is threaded externally at 45 for co-operating with internally threaded clamping means 12 and shows how the insert may be extended to provide the sealing nipple 56.

FIG. 7 is a modification showing an edge to surface metal-to-metal seal between the sleeve 6 and the end wall closing the annulus which contains the sealing lip, the edge being marked 23 and the surface being marked 24.

The principal parts embodied in the form of construction shown in FIG. 1 are present in the remaining figures and the same reference numerals as are used in FIG. 1 are indicated in these other figures to indicate like or equivalent parts.

What I claim is:

1. A hose coupling component comprising a hose having inner and outer resilient layers and an intermediate reinforcing layer embedded between them, the inner resilient layer and the reinforcing layer of the hose projecting beyond the end of the outer layer and the projecting portion of the reinforcing layer being separated from the inner layer, and comprising an end fitting including a rear inner sleeve and a forward outer ring, co-operating axial clamping means and an externally forwardly tapering insert nipple projecting into the hose, said projecting portion of the reinforcing layer being gripped between the sleeve and ring, said projecting portion of the inner layer being squeezed to form a sealing member between the sleeve and the insert nipple by having forced said insert nipple into the hose, the internal surface of said sleeve being grooved and disposed substantially parallel to the longitudinal axis of the coupling so as to co-operate with the external tapering surface of the insert nipple to form between the said surfaces an annulus of rearwardly progressively lessening cross-sectional area, the outer zone of the resilient material of the sealing member being axially keyed with the grooved surface of the sleeve and being sealed with the sleeve, and means sealing the annulus at one end.

2. A hose coupling component comprising a hose having at least an inner resilient layer and at least one reinforcing layer and an end fitting and in which an end portion of said reinforcing layer is separated from the inner resilient layer, said end fitting comprising an inner sleeve and an outer ring, the outer diameter of the sleeve being greater than the outer diameter of the inner resilient layer thereby forming a forwardly facing shoulder, shoulder means on the outer ring, said reinforcing material being bent outwards and extending over said shoulder, co-operating axial clamping means and an externally forwardly tapering insert nipple projecting into the hose, the said end portion of the reinforcing layer being gripped between the said shoulder and the said shoulder means, said end portion of the inner resilient layer being squeezed to form a sealing member between the sleeve and the insert nipple by having forced said insert nipple into the hose, the internal surface of said sleeve having at least one helical or annular groove and disposed substantially parallel to the longitudinal axis of the coupling so as to co-operate with the externally tapering surface of the insert nipple to form between the said surfaces an annulus of rearwardly progressively lessening cross-sectional area, the outer zone of the resilient material of the sealing member being axially keyed with the grooved surface of the sleeve and sealed thereto, and means for sealing the said annulus at one end.

3. A hose coupling component according to claim 2 in which the externally forwardly tapered insert nipple has a rear flange, the axial movement and holding together of the clamping members having forced the insert into the hose, sealed the flange against the sleeve and formed a seal between the rear surface of the flange and the rear clamping member or a member co-operating therewith.

4. A hose coupling component according to claim 2, in which the clamping means comprise co-operating forward and rearward clamping members, the forward clamping member carrying the said outer ring, and said insert nipple being separate from said clamping members and insertable into the hose without rotating it.

5. A fitting of the detachable and reusable type for use on the end of a flexible hose having an inner resilient tube and a reinforcing layer thereon, said fitting comprising a socket forming a tapering gripping surface, said socket being screw-threaded, a sleeve with a bore adapted to surround the said inner resilient tube, said bore being provided with internal peripheral projections therearound and re-entrant groove means, one end of said sleeve forming a gripping surface and the other end a sealing face, an insert nipple the external peripheral surface of which forms with the crests of said projections a concentric annulus having a cross-sectional area less than the cross-sectional area of the said inner resilient tube, said crests being on a surface parallel and concentric with said inner resilient tube, one end of said nipple being shaped to facilitate entry into the said inner resilient tube and the other end to form a sealing face to form a pressure-tight joint in cooperation with the said sealing face of the sleeve, a threaded means including said screw-thread of the socket by which the said sleeve and said insert nipple can be moved and held axially so that the said reinforcing layer is firmly secured between the said gripping surfaces of the said socket and sleeve and said pressure-tight joint made, an end portion of the said resilient tube is constrained within the said annulus and subjected to internal stress so that mutual pressure contact is established between the said projections of said sleeve and the outer surface of the said inner resilient member and between the outer surface of said insert nipple and the inner surface of the said inner resilient tube and some of the material of said inner tube is displaced outwardly into said groove means, said socket having a portion with a bore of smaller internal diameter than the external diameter of the sleeve and said insert having an axial extent greater than the combined axial extent of the said sleeve and the said smaller bore and portions of the reinforcing layer and said inner resilient tube forwardly of the sleeve being surrounded by the said smaller bore of the socket and constrained around said extended insert by the said smaller bore, and a means by which said insert nipple can be connected to external apparatus.

6. A fitting of the detachable and reusable type for use on the end of a flexible hose having an inner resilient tube and a reinforcing wire braid layer thereon, said fitting comprising a body having a nipple portion projecting axially from the body, said nipple having a central bore therethrough, said nipple portion adapted to be arranged within the end portion of said resilient tube, the outer diameter of said nipple portion exceeding the inner diameter of said resilient tube when unstressed so as to stretch the material of the tube over the nipple when the hose is assembled on the nipple portion, said body having an annular abutting surface adjacent the nipple portion, said surface extending radially beyond the outer diameter of the nipple portion when the nipple portion is assembled within the resilient tube, an outer sleeve having a conically tapered section at the interior thereof and threaded means to position and hold said sleeve relative to said body, a metal sealing sleeve adapted to be inserted between the outer wall at the end of the resilient tube and the wire braid layer, said sealing sleeve having an inner wall surrounding the outer surface of the end of the resilient tube, and said inner wall having axially spaced areas of different radial extent to provide a seal against the outer surface of the resilient tube, one end of said sealing sleeve arranged to bear against said annular abutting surface to limit the axial movement of said sealing sleeve, said sealing sleeve having a cylindrical outer surface underlying the end portion of the wire braid layer, the other end of said sealing sleeve having a narrow conical outer surface, the juncture between the cylindrical and conical outer surfaces forming a crest arranged radially opposite the conically tapered section of the outer sleeve to cooperate therewith when the outer sleeve is axially positioned with respect to the body to grip the wire braid layer at a narrow zone spaced inwardly from the end of the wire braid layer.

References Cited in the file of this patent

UNITED STATES PATENTS

| | | |
|---|---|---|
| 755,204 | Witzenmann | Mar. 22, 1904 |
| 2,428,189 | Wolfram | Sept. 30, 1947 |
| 2,797,474 | Main | July 2, 1957 |
| 2,809,056 | Kaiser | Oct. 8, 1957 |

FOREIGN PATENTS

| | | |
|---|---|---|
| 930,581 | France | Jan. 29, 1948 |